(12) United States Patent
Baldwin et al.

(10) Patent No.: US 11,170,344 B2
(45) Date of Patent: Nov. 9, 2021

(54) JOB MATCHING SYSTEM AND METHOD

(71) Applicant: Clearfit Inc., Toronto (CA)

(72) Inventors: Ben Baldwin, Toronto (CA); George Baldwin, Toronto (CA)

(73) Assignee: CLEARFIT INC., Toronto (CA)

( * ) Notice: Subject to any disclaimer, the term of this patent is extended or adjusted under 35 U.S.C. 154(b) by 0 days.

(21) Appl. No.: 16/102,402

(22) Filed: Aug. 13, 2018

(65) Prior Publication Data
US 2019/0095864 A1    Mar. 28, 2019

Related U.S. Application Data

(63) Continuation of application No. 12/654,351, filed on Dec. 17, 2009, now abandoned, which is a continuation of application No. 12/320,706, filed on Feb. 2, 2009, now abandoned, which is a continuation of application No. 09/386,641, filed on Aug. 31, 1999, now Pat. No. 7,502,748.

(51) Int. Cl.
*G06Q 10/10*     (2012.01)
*G06Q 10/06*     (2012.01)

(52) U.S. Cl.
CPC .......... *G06Q 10/10* (2013.01); *G06Q 10/06* (2013.01); *G06Q 10/0639* (2013.01); *G06Q 10/063112* (2013.01); *G06Q 10/1053* (2013.01); *Y04S 10/50* (2013.01)

(58) Field of Classification Search
CPC ......... G06Q 10/00; G06Q 40/06; G06Q 40/00
USPC ....................................................... 705/7.15
See application file for complete search history.

(56) References Cited

U.S. PATENT DOCUMENTS

| | | | | |
|---|---|---|---|---|
| 5,737,734 | A  * | 4/1998  | Schultz ................... | G06F 16/40 |
| 6,385,620 | B1 * | 5/2002  | Kurzius ................. | G06Q 10/10 |
| 7,827,117 | B2 * | 11/2010 | MacDaniel ............ | G06Q 30/08 |
| | | | | 705/321 |
| 2006/0229899 | A1* | 10/2006 | Hyder .................... | G06Q 10/10 |
| | | | | 705/1.1 |

OTHER PUBLICATIONS

Mendenhall "Prediction of Job Tenure and Work Performance of Nursing Home Employees in Selected Locations Within the State of Kansas", 1981, University Microfilms International, pp. 1-164. (Year: 1981).*

Notice of References cited issued Oct. 30, 2008 in related U.S. Appl. No. 09/386,641.

Notice of References cited issued Nov. 10, 2003 in related U.S. Appl. No. 09/386,641.

(Continued)

*Primary Examiner* — Romain Jeanty

(57) ABSTRACT

A system for matching employment candidates to employment positions is disclosed. Measures of personality traits and optionally interests are used to match candidates to employment positions. Candidates' traits may be assessed by administering a questionnaire. A similar questionnaire may be provided to suitable employees who are already filling, or have previously filled, employment positions, in order to assess personality traits of suitable employees for each position. Results are preferably received and compared. A list of suitable jobs may then be provided to the candidate. Software and computer systems embodying the method are also disclosed.

19 Claims, 6 Drawing Sheets

(56) References Cited

OTHER PUBLICATIONS

Notice of References cited issued Oct. 8, 2002 in related U.S. Appl. No. 09/386,641.
Notice of References cited issued Dec. 4, 2001 in related U.S. Appl. No. 09/386,641.
Notice of References cited issued Sep. 16, 2009 in related U.S. Appl. No. 12/320,706.

* cited by examiner

JOB MATCHING SYSTEM AND METHOD

This application is a continuation application of U.S. Continuation application Ser. No. 12/320,706, filed Feb. 2, 2009, which is a continuation of U.S. application Ser. No. 09/386,641 Filed Aug. 31, 1999, in its entirety herein incorporated by reference.

The present invention relates to a method and system for matching employment candidates to employment positions, and more particularly to a job matching system and method that utilizes personality profiles and possibly interests of candidates to match candidates to jobs.

BACKGROUND OF THE INVENTION

Locating a suitable candidate for an available employment position is typically a difficult task. The traditional job application process requires interested candidates to submit a resume in response to a job availability advertisement. Such advertisements set out job requirements, typically in the form of desired or required job skills. The resumes, in turn, include the educational, employment, skill, and personal interests of the candidates.

Too often, however, the qualifications of the candidates presented on the resumes appear all too similar, making the review and paring of potential candidates extremely difficult. Similarly, the resumes are often distorted or otherwise unreliable. This is particularly acute with entry-level job openings. Nevertheless, resumes of the most promising candidates are selected, and these candidates are personally interviewed, screened by telephone, or the like. Usually several rounds of personal interviews are used to further weed the selected candidates, until few are left. Sometimes a candidate is hired from these selected few, without further interviewing or testing.

Others may be subjected to a job aptitude or personality test, and thereafter hired.

Of those that are eventually hired using the conventional hiring process, many will not be successful for many reasons. For example, the eventual employees may not fit into the employer's culture, or have the personality traits or interests that are desirable for success.

Accordingly, a more effective method of matching job candidates to jobs is desirable.

SUMMARY OF THE INVENTION

It is an object of the present invention, to provide an improved job matching system, that more quickly and easily identifies suitable job candidates, and provides an increased likelihood that matched job candidates are suitable for a particular job.

In accordance with the present invention, measures of personality traits are used to match candidates to employment positions. Candidates' traits may be assessed by administering a questionnaire. A similar questionnaire may be provided to suitable employees who are already filling, or have previously filled, available employment positions at different companies within different industries, in order to assess personality traits of suitable employees for each position. Results are preferably received and compared. A list of suitable jobs with different employers may then be provided to the candidate.

Advantageously, then, candidates may communicate to potential employers at an early stage of the application process that they have a personality profile suitable to a particular employment position. In turn, an employer may take comfort that a matched candidate has a personality profile suitable for an employment position.

Methods in accordance with the present invention may be embodied in computer software.

Other aspects and features of the present invention will become apparent to those of ordinary skill in the art, upon review of the following description of specific embodiments of the invention in conjunction with the accompanying figures.

BRIEF DESCRIPTION OF THE DRAWINGS

In figures which illustrate, by way of example only, preferred embodiments of the invention.

DETAILED DESCRIPTION

Figure 1:
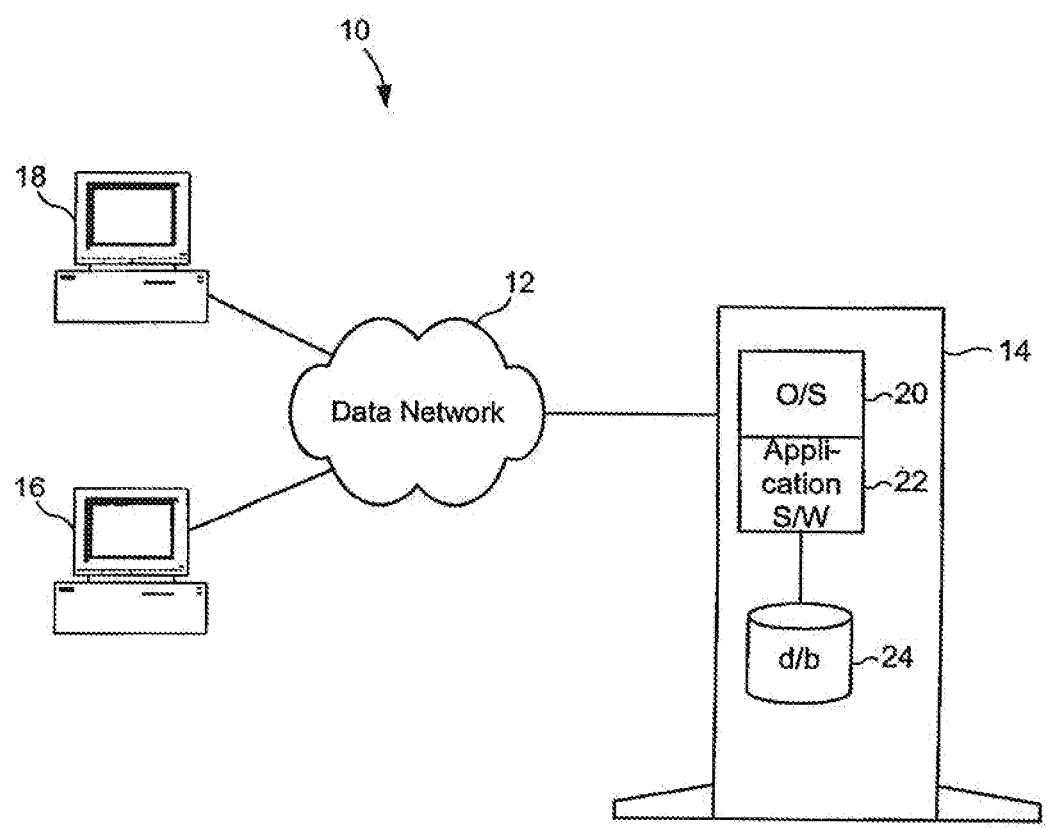
FIG. 1 illustrates a computing system used to implement a job matching system exemplary of an embodiment of the present invention.

FIG. 1 illustrates a computing system 10, used to implement a job matching system exemplary of the present invention. Computing system 10 includes a computer data network 12, in communication with computing device or server 14, and computing devices 16 and 18.

Computer data network 12 may for example, be the public internet; a local area network; or any other computing network known to those of ordinary skill in the art. Server 14 is preferably a conventional network capable server, and as such may include a microprocessor; memory; a network interface; a keyboard; and a monitor (all not shown).

Most preferably, server 14 is at the premises of, and controlled by administrators of the job matching method disclosed herein. Computing device 16 is preferably at the premises of, and controlled by a potential employer; while computing device 18 is preferably at the premises of, and controlled by an employment candidate. For clarity only server 14 and two other network interconnected computing devices 16 and 18 are illustrated. Of course, server 14 is preferably in communication with numerous other network interconnected confuting devices that may be controlled by various other employers and employment candidates.

The memory of server 14 stores an operating system 20, such as Windows NT Server, UNIX, or similar network aware operating system. As well, memory of server 14 stores application software 22 that enables server 14 to execute steps exemplary of the present invention. Application software 22 may also include an internet Web server, such as the Apache Web server, or Microsoft Back Office; an interpreter, real-time compiler, or libraries allowing execution of programs in a known computing language, such as Perl or Visual Basic; a database engine, such as Microsoft SQL Server, or Oracle. Additionally, server 14 stores a database 24 storing job and candidate data, as described below. As will be appreciated, memory of server 14 may include any suitable combination of random access memory; read-only memory; disk storage memory; or the like.

Computing devices 16, and 18 are preferably conventional network aware "client" computers, and as such include a microprocessor; a network interface, such as a modem or Ethernet interface; keyboard; display; and memory storing an operating system such as Windows NT, the MAC OS, Linux or the like and including network interface software; and preferably a hypertext markup language ("HTML") capable network browser, such as the Netscape Communicator, Navigator or Microsoft Internet Explorer browser. Most preferably this browser is further capable of interpreting and executing program instructions downloaded from the interconnected network and from server 14, possibly written in the Java or JavaScript computing languages.

Figure 2:
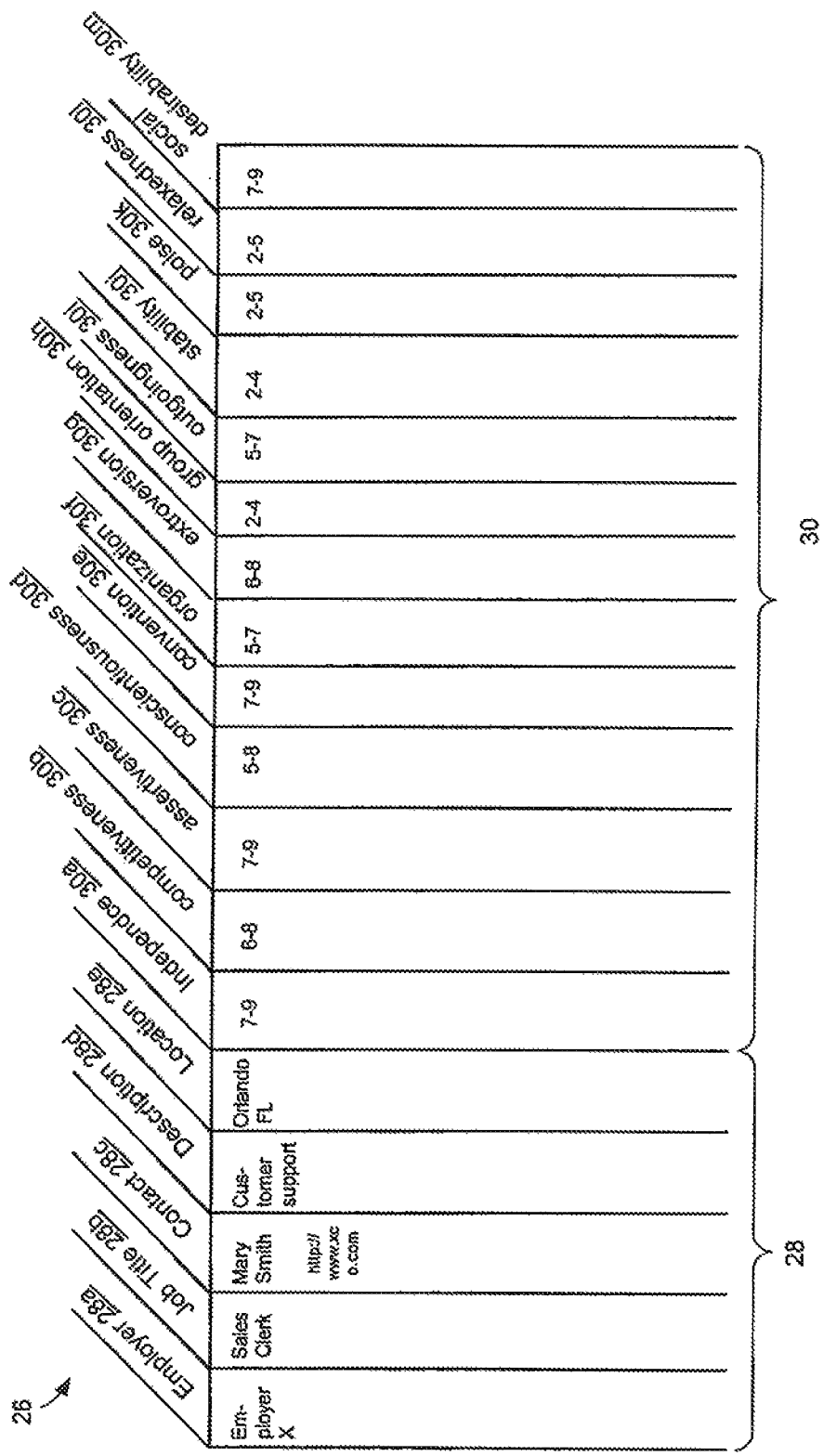
FIG. 2 illustrates the format of a portion of an exemplary database stored on a computing device of FIG. 1.
Figure 3:
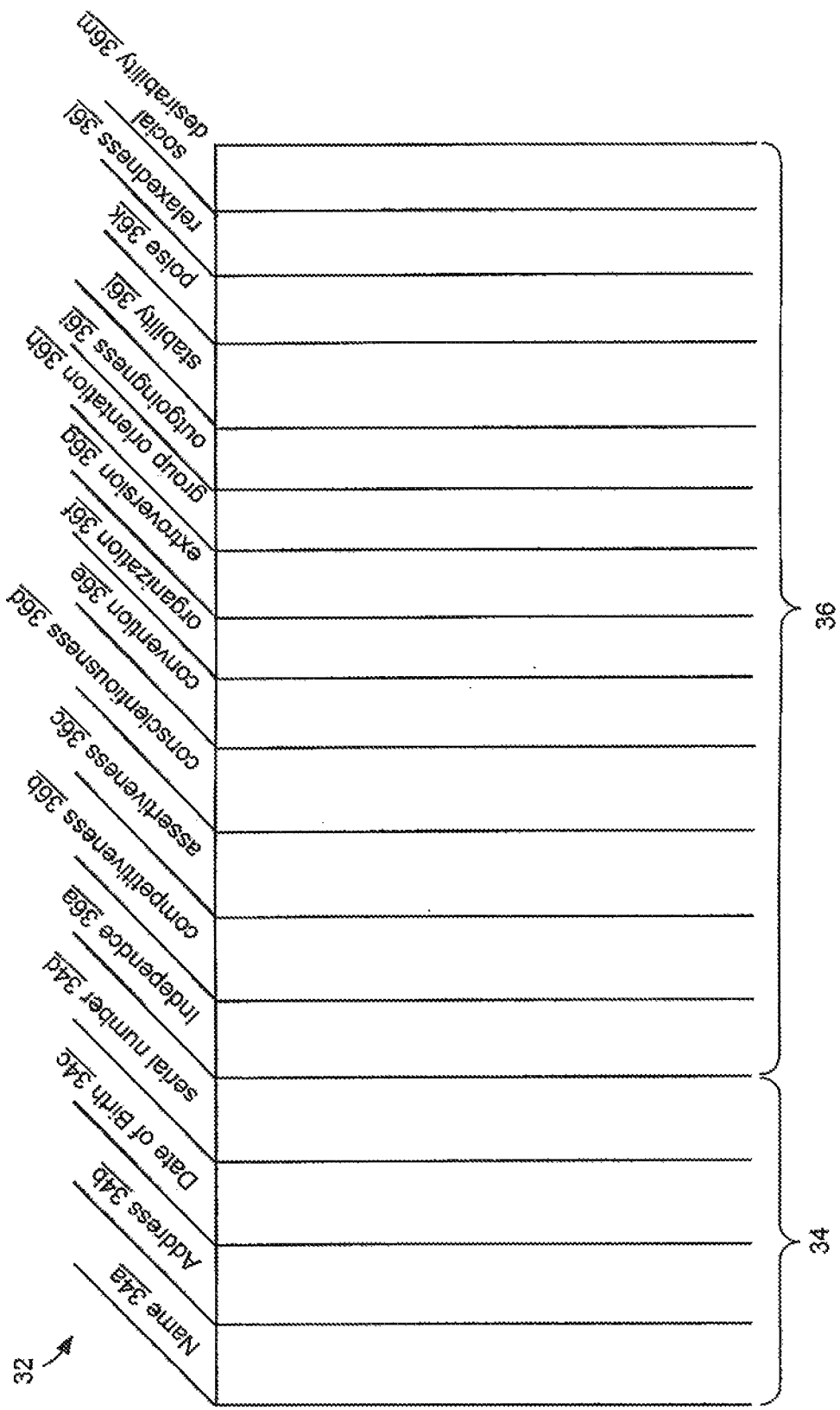
FIG. 3 illustrates the format of another portion of an exemplary database stored on a computing device of FIG. 1

An exemplary organization of database 24 is illustrated in FIGS. 2 and 3. As illustrated in FIG. 2, database 24 includes an employment position portion 26, that preferably includes a relational database table made up of records for each of a number of employment positions, that are preferably available. Each record preferably includes several fields 28 storing details about an available job, including such data as employer; job title; contact person; job description; location; and the like, as illustrated in fields 28*a*, 28*b*, 28*c*, 28*d*, and 28*e*, respectively. Additionally, each record includes a plurality of personality attribute fields 30 each containing a range of numerical values assigned to an identified personality attribute of a desired employee for that job.

As illustrated, example personality attribute fields may include measures of a preferred employee's
  a) independence (field 30*a*) [low score=diplomatic, high score=independent];
  b) competitiveness (field 30*b*) [low score=cooperative; high score=competitive];
  c) assertiveness (field 30*c*) [low score=submissive, high score=assertive];
  d) conscientiousness (field 30*d*) [low score=spontaneous, high score=conscientious];
  e) convention (field 30*a*) [low score=innovative, high score=convention];
  f) organization (field 30*f*) [low score=reactive; high score=organized];
  g) extroversion (field 30*g*) [low score=introvert, high score=extrovert];
  h) group orientation (field 30*h*) [low score=self sufficient, high score=group oriented];
  i) outgoingness [low score=reserved, high score=outgoing] (field 30*i*);
  j) stability (field 30*j*) [low score=emotional; high score=stable];
  k) poise (field 30*k*) [low score=restless, high score=poised];
  l) relaxedness (field 30*l*) [low score=excitable, high score=relaxed]; and
  m) social desirability (field 30*m*) [low score=frank, high score=social desirability].

Each field is preferably populated with a range of numerical entries, bounded between two finite values, and derived as described below. In the example embodiment, values between 1 and 10 are used. Collectively, the assessment of these attributes provide an aggregate personality profile for any particular job. Most preferably, identical personality attributes for each employment position stored in database 24 are evaluated to form an aggregate profile.

Additionally, and optionally, each record could contain a plurality of interest attribute fields (not shown) each containing a range of numerical values assigned to an identified interest attribute of a desired employee for that job. Interest attributes may for example identify an employee's interest in working with people; working with data; or working with things. Each interest attribute field also contains a range of numerical values assigned to an identified interest attribute of a desired employee for that job.

As illustrated in FIG. 3, database 24 further includes a candidate portion 32, including a relational database table made up of entries for each available candidate. Each record contains fields 34 identifying the candidate preferably by name; address; date of birth; serial number; and the like, as illustrated as fields 34*a*, 34*b*, 34*c*, 34*d*, respectively. As well, each record contains a plurality of personality attribute fields 36 for that candidate. The serial number may be generated by application software 22. As will become apparent, each personality field 36*a*-36*m* is preferably populated with a single numerical measure of the associated candidate's trait.

The personality attribute fields 36 correspond to those stored in fields 30, for employment positions. That is, each field 36 stores a value representing the assessment of a particular personality trait of a candidate; a corresponding field 30 stores an appropriate range of values representing the assessment of that trait for suited candidates for a particular employment position.

Figure 4:
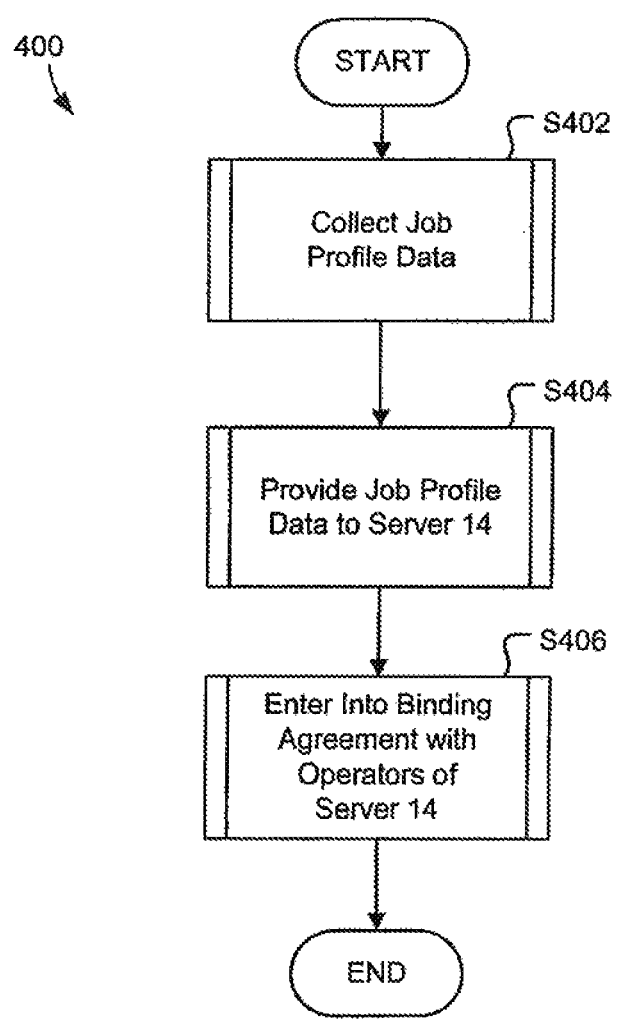
FIG. 4 is a flow chart of steps performed by an employer, exemplary of an embodiment of the present invention.

In operation, employers provide personality profile information regarding employment positions as desired, as illustrated in steps 400 of FIG. 4. Specifically, data profiling each employment position is initially assembled by employers in step S402. Most preferably, a potential employer collects job profile data, representative of personality profiles for ideal candidates for available employment positions. The data may be collected by a human resource department of an organization. The data is ideally collected with the assistance of a representative familiar with job matching methods exemplary of the present invention. Most preferably the job profile characteristics for a potentially available job are determined by assessing those personality traits of top performers already employed or previously employed in the available position. The job profile characteristics are quantified for each personality trait identified as relevant for the particular position. Preferably, multiple employees (or former employees) are profiled so that a numerical range of acceptable values can be determined for each personality trait.

Additionally, or optionally, a job profile may be formed manually, by assessing desirable ranges of personality traits heuristically with the assistance of a representative familiar with job matching methods exemplary of the present invention. This may be particularly useful for employment positions that have not previously been filled, or to confirm that perceived personality traits of employees correspond to those of top performers. Of course, where perceived traits differ from those of actual top performers, the assessed traits of proven top performers should be used.

A specific system that may be used to assess the personality profiles of employees, is for example, available from ICES Assessment Systems Inc., of $2^{nd}$ Street, Holetown, St. James, Barbados, West Indies in association with the trademark ICES PLUS ASSESSMENT and is detailed more particularly in the PREVUE ASSESSMENT Technical Manual, $3^{rd}$ Edition, ICES Assessment Systems Inc., June 1998, the contents of which are hereby incorporated by reference. As detailed therein, psychologists have identified five major factors indicative of personality, namely Extraversion; Agreeableness/Independence; Conscientiousness; Anxiety; and Openness to Experience. A questionnaire forming part of the system is heralded as statistically accurate, consisting of one-hundred-and-fifty-two questions. Answers to these questions are used to produce a mapping of personality traits in thirteen categories, evaluated numerically with values in the range of 1-10. The categories correspond to those traits represented by fields 30*a*-30*m* or 36*a*-36*m*. While the ICES system provides a convenient personality profile assessment for individuals, it will be understood that many other profile assessments may be used. For example, a behavioral psychologist could easily design a profile assessment questionnaire that could be used to determine measures of many recognized personality traits. A suitable profile assessment questionnaire should ensure that answers to the questions provide statistically valid and reliable results. Server 14, and the exemplary methods of practising the present invention would be suitably modified to use such a questionnaire and store tabulated results in database 24.

Regardless of which technique is used to gather the relevant information, the employer may then present such information to server 14 by way of computing device 16 and network 12 in step S404. For example, once the data is collected, it may be passed to server 14 by way of an HTML form presented at device 16. Alternatively, the data may be submitted by way of electronic mail, or using any other known protocol, such as for example the file transfer protocol, or the like. Alternatively, the collected data may be transferred to an operator or administrator proximate server 14 using another known method. The data could, for example, be delivered in person, by telephone, regular mail, or in many other ways. The operator or administrator may then enter the data at server 14. Once received the data is stored within portion 26 of database 24.

Additionally, a prospective employer should enter into a binding agreement with operators of server 14. The agreement should oblige the prospective employer to agree to grant interviews or personal contact to suitable candidates, as described below. The agreement may further oblige an employer to notify server 14 or its operators as soon as a job is no longer available; and to pay the operators for services provided. Again, if the law permits, a suitable contract may be entered into using HTML forms filled-in and executed at device 16 in step S406.

For example, suppose a prospective employer X wishes to a new sales clerk. Personality evaluations of existing clerks for employer X (performed in step S402) using the ICES PLUS ASSESSMENT SYSTEM reveal that the ideal sales clerk has the following range of personality traits, as quantified:

a. independence=7-9;
  b. competitiveness=6-8;
  c. assertiveness=7-9;
  d. conscientiousness=5-8;
  e. convention=7-9;
  f. organization=5-7
  g. extroversion=6-8;
  h. group orientation=2-4;
  i. outgoing=5-7
  j. stability=2-4;
  k. poise=2-5;
  l. relaxation=2-5 and
  m. social desirability=7-9.

As noted, collectively the assessment of these traits may be referred to as an aggregate job profile for a sales clerk with employer X.

As will be appreciated, the aggregate profile may be assessed using questionnaires presented to current employees, and completed in conjunction with periodic employee performance evaluations for existing employees. Alternatively, the aggregate profile may be created as a job becomes available. As another option, the job profile could be created by human resource specialist, psychologists or the like. Once available, this data is provided to server 14, in step S404 and stored within portion 26 of database 24. Specifically, a record representative of a sales clerk for company X is created and job-particular fields 28 are filled. Trait fields 30*a*-30*m* are completed accordingly, reflecting the assembled data, as illustrated in FIG. 2. Employer X may also enter into a service agreement as detailed with reference to step S406.

Other records of database table 26, representative of other available employment positions may be completed by employer X, or other employers. Most preferably all available employment positions are characterized by aggregate job profiles including evaluations of the same defined traits. Thus, all database records preferably include identical defined personality attribute fields.

As such, database 24 serves as a repository for available employment positions from multiple employers. As a particular job position is filled, the corresponding employer could notify server 14, so that the particular job may be deleted from the database 24. Alternatively, for reasons that will become apparent, filled positions may also be maintained within database 24.

Figure 5:
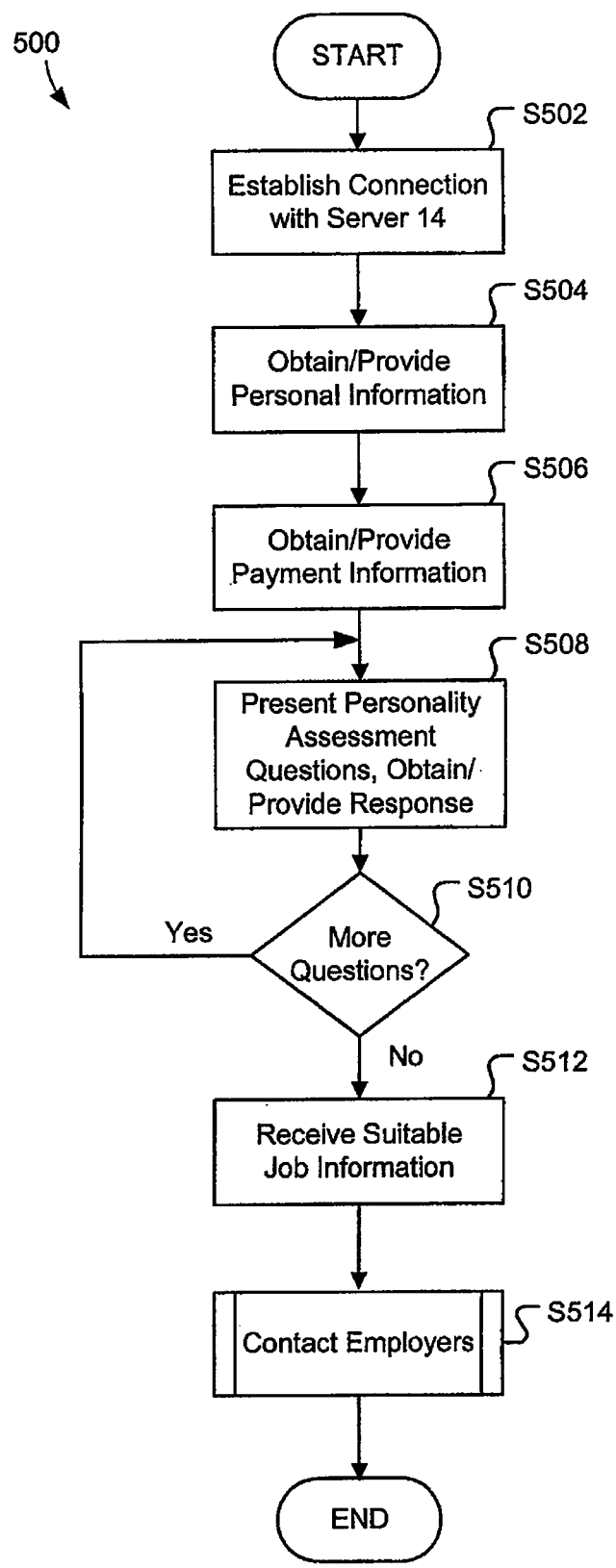
FIG. 5 is a flow chart of steps performed by an employment candidate, exemplary of an embodiment of the present invention.

Once at least some entries of database 24 have been populated with job related data, an employment candidate proximate network computing device 18, preferably performs steps•500 illustrated in FIG. 5. Specifically, the candidate uses computing device 18 including its network interface software and browser, to establish a network connection with server 14 over network 12, in step S502. In response, server 14 using application software 22 stored within its memory presents the candidate proximate computing device 18 with a questionnaire allowing the candidate to present personal information such as the candidate's name, address, date of birth, and the like, in step S504. As well, preferably computing device 18 prompts the candidate to present service payment information, such as credit card billing information; an electronic cash identifier; or the like in step S506, for the job matching services provided by server 14. The prompts and questionnaire are preferably presented to the candidate by way of an HTML form generated by browser software at computing device 18. Next, server 14 verifies the payment information, and preferably charges the candidate's payment account a fee for using the described job matching service, also in step S506.

The personal information is then preferably stored at server 14 in fields 34*a*-34*d* of database 24. Thereafter, server 14 causes computing device 18 to present a personality assessment questionnaire to the candidate, by for example, causing a series of standardized questions to be presented to the candidate, in steps S508-S510. Again, the questions are preferably presented to the candidate by way of an HTML form generated by browser software at computing device 18. Alternatively, the questionnaire could be presented by way of a Java applet, or JavaScript program provided by server 14 to device 18. As will be appreciated, such a form allows questions to be answered. Each response may be provided by computing device 18 to server 14, by data network 12 as each response is provided, also in step S508. Alternatively, all responses may be provided at the conclusion of the questionnaire.

Preferably, the candidate assessment questionnaire is identical to the assessment presented by employers to suitable employees as detailed with reference to step S402 (FIG. 4). Again, the known ICES PLUS ASSESSMENT system may be used to present questionnaires to candidates. Alternatively, another personality assessment system may be used. Preferably, the series of standardized questions includes internal consistency measures to ensure that a candidate's responses are consistent and therefore likely honest. Most preferably, questions asked of candidates and employees are compatible, so that a correlation between candidate scores and employer job profiles may be easily determined. Additionally, and optionally, the questionnaire may include questions suitable to numerically assess the candidate's interests.

Figure 6:
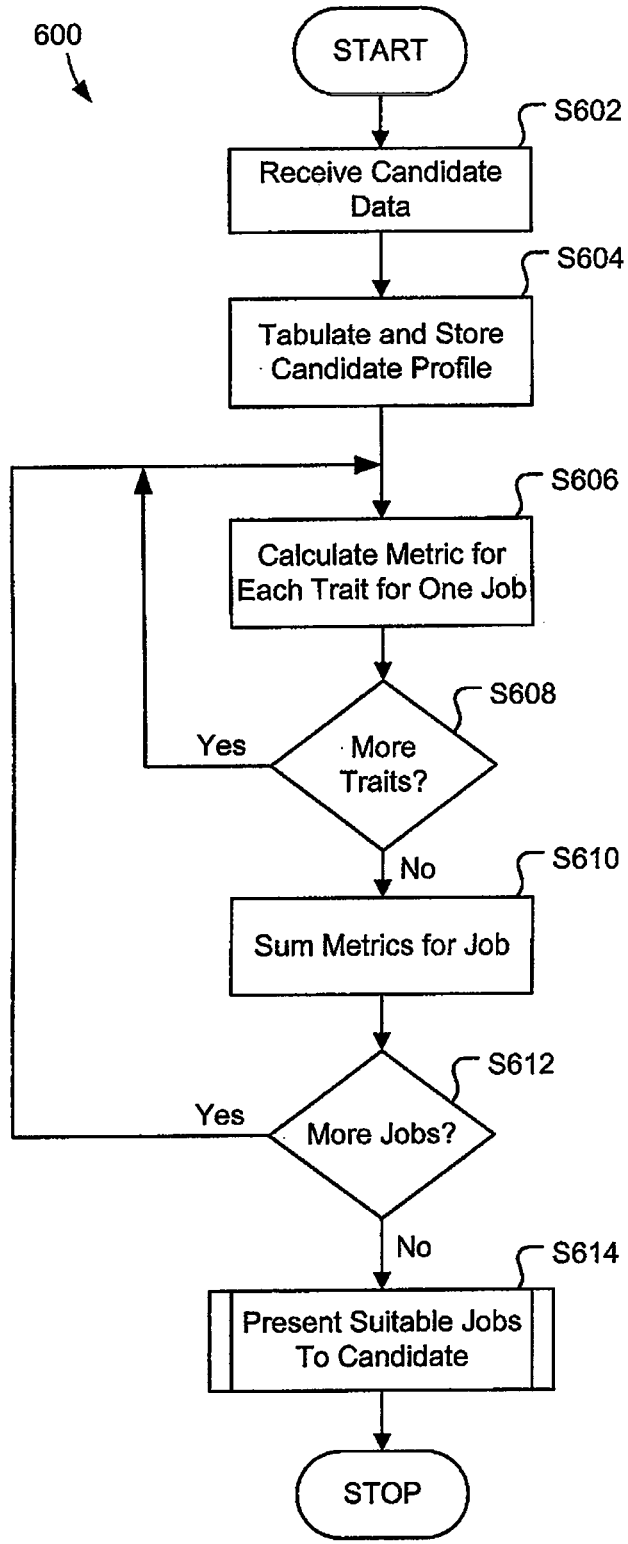
FIG. 6 is a flow chart of steps performed by a computing device of FIG. 1, exemplary of an embodiment of the present invention.

FIG. 6, in turn illustrates steps 600 performed at server 14. As illustrated, once the above described questionnaire has been completed by a candidate, results are received in step S602, and application software 22 at server 14 tabulates values to populate fields 36 for that candidate in step S604. Alternatively, the Java applet or JavaScript application provided to computing device 18 may tabulate values to populate fields 36 for the candidate.

At the conclusion of tabulating suitable personality measures for a candidate, server 14 compares personality measures for the candidate to desired personality traits for jobs stored within portion 30 of database 24. This may be done in any number of ways. For example, server 14 may calculate the difference between the candidate's evaluated personality traits and the stored personality traits for all available jobs within the database 24, in steps S606-S612 as illustrated in FIG. 6. A known metric may be used to calculate this difference in step S606, for each personality trait. For example, a value of zero (0) may be awarded for each candidate trait value stored in fields 36a-36m which falls within the range of the corresponding employment position trait stored in fields 30a-30m. For each trait for which the candidate trait value does not fall within the range, a value equal to the distance between the candidate trait value and the midpoint of the employment position range may be awarded (ie. Difference=abs (candidate score−[(lower bound+ upper bound)/2]).

Once metrics for all traits within the aggregate profile for each available job are tabulated, these may be summed. As should be apparent, the closer to zero the summed score, the better the personality match between a candidate and an employment position. For convenience, the tabulated score may be converted into a more meaningful indicator of job suitability, by, for example subtracting the tabulated score from 95. Thus, a candidate with a perfect match is said to be a 95% match for the available job. The summed score for each employment position may be stored temporarily within memory 22 or within database 24.

In the event interest attribute fields stored within database 24, these too may be compared to assessed interest attributes for each candidate in a similar manner.

Optionally, table 26 may further include one or more fields (not illustrated) for each available employment position identifying "critical personality traits" for suitable job candidates. These "critical personality traits" would identify which of traits stored in fields 30a-30m necessitate a match for a given candidate to be considered suitable for a given job. That is, for candidates that do not have a corresponding personality trait that fall within the range for a critical category, the job will simply not be provided to the candidate. For example, a job may require an extremely diplomatic individual. As such, diplomacy may be identified as a critical trait, requiring a match. Assuming a candidate did not exhibit a measure of diplomacy in the range for the particular employment position, the candidate would not be assessed as suitable for the job, notwithstanding that measures for all other traits are within the identified range for the job.

Next, in step S614, server 14 may provide to the candidate by way of computing device 18 and network 12 a list of jobs for which the candidate appears suitable, based on the comparisons performed in steps S606-S612. The list may be sorted in order of match. As well, only matches in a certain proximity to the ideal job profile may be provided to the candidate. For example, server 14 may provide a list including those only those jobs for which a score of 80% or higher was tabulated. The provided list preferably includes complete job application information, including the job title; job description; name of employer; and contact information. The contact information may also include a network identifier in the form of a uniform resource locator ("URL") identifying the home page of a potential employer. The list may be e-mailed to the candidate, provided as an HTML document, or may be downloaded by a candidate at this device 18. The URL identifying the potential employers may be used to contact the employers using device 18. The candidate may receive this list in step S512 (FIG. 5). As should be appreciated, payment information need not be collected in step S506, but could instead be collected and verified at any time prior to step S512.

Next, the candidate may individually select those particular jobs to which the candidate wishes to apply. The candidate may then apply to those employers directly, by dispatching a resume, identifying that services provided by server 14 have been used, and potentially under a cover letter/sheet provided by server 14, or operators of server 14 certifying a match using database 24. Alternatively or additionally, the candidate may use computing device 18 and the URL provided in step S512 to contact the employer in step S514. As well, in addition to providing the candidate with a list of jobs, in steps S512 and S614, application software 22 at server 14 may also provide computing device 16 with a printable certificate (in HTML, POSTSCRIPT, PORTABLE DOCUMENT FORMAT, or the like). The certificate may specifically identify the operators of server 14; the candidate; the employer and job; and a unique identifier, that may be used by an employer to gauge the authenticity of the document. The certificate acts as an authenticator, and thus authenticates that described job matching services have been used. By advising a potential employer that job matching service exemplary of this invention were used, the candidate may assure potential employers that their personality is suited for the available job. As will be appreciated, the URL provided to the candidate in step S512 and S614 need not be generally known and may thus similarly function as an authenticator. The employers, in turn, may rely on the results of calculations of server 14 and should provide those candidates with personal contact, preferably in the form of interviews. Employers, of course, may further screen candidates by reviewing resumes to ensure that the candidates have minimum skills. The cover letter provided by server 14 (or operators of server 14) also preferably includes an indication of the degree of match of the candidate. For example, the cover letter may indicate the degree of match as "Excellent"; "Very High"; "Above Average" or include a numerical measure such as "78% Match"; "80% Match"; "93% Match" or the like, calculated as above.

In the event that the candidate has matched employment positions that are no longer vacant, the employers may still wish to offer the candidate personal contact in view of the high degree of match between the candidate's personality and the personality profile of an employment position that may one day become vacant. Alternatively, the employer may wish to keep the candidate's name on file.

Additionally, the cover sheet may further identify a job type, for which the candidate has been found to be a suitable match. For example, if a candidate has been found to be suitable match for one or more sales clerk positions, the cover sheet may indicate that the candidate has personality traits suitable for such a position. This being the case, the candidate could approach other employers, not necessarily using the services of server 14, and offering such employment positions with the cover sheet. Such employers could give credit to the job match, as they feel appropriate or could contact the operators of server 14 for more information.

Preferably, the potential employers are not provided with particulars about suitable candidates, and therefore are unable to initiate contact with the candidates. Each candidate thus preferably has full control to contact the employers of choice, and obtain preferential treatment using the results of the match provided by server 14.

Conveniently, because the candidates have been pre-screened in accordance with methods exemplary of the present invention, employers are able to process their applications more expeditiously, with assurances that the personality profile of the candidate is suited for the available job position. Even if candidates do not appear to have the exact skills required by the employer, the employer has some assurance that the candidate, with proper training could fill the job. As should be appreciated, the methods detailed herein, are particularly well suited to select candidates for entry level positions. Candidates, on the other hand are provided with preferential treatment as they have been identified a potentially successful candidates.

As will be appreciated, the above described embodiments are susceptible to numerous modifications. Most significantly, the described methods could be performed without the use of any computing equipment. Job and candidate assessments could be conducted manually, and results could be tabulated manually. Results could be hand or mail delivered. Similarly, only portions of the described methods could be performed manually.

As well, while the organization of software blocks, data and data structures have been illustrated specifically and as clearly delineated, a person skilled in the art will appreciate that numerous other arrangements of software blocks and data are possible. For example, databases may be arranged differently, with more or fewer fields, or an object oriented database could be used. Additionally, software embodying the described methods may distributed by way of computer readable medium or by way of carrier wave propagated on network 12.

The above described embodiments, are intended to be illustrative only and in no way limiting. The described embodiments of carrying out the invention, are susceptible to many modifications of form, size, arrangement of parts, and details of operation. The invention, rather, is intended to encompass all such modification within its scope, as defined by the claims.

What is claimed is:

1. A method of using a Web server for authenticating a match of an employment candidate with one or more of a plurality of employment positions via a computer processor programmed for executing a set of instructions stored in memory to implement steps, the Web server in communication with an employer computing device and a candidate computing device over the Internet, the employer computing device and the candidate computing device communicating with the Web server over the Internet using network browsers, the steps comprising:

receiving over the Internet employment position data from the employer computing device measuring a plurality of defined personality traits for suitable employment candidates for each employment position of the plurality of employment positions, the employment position data including a plurality of ranges, each range indicative of a range of values for a respective personality trait of a suitable candidate for said each employment position of the plurality of employment positions, the personality traits containing trait information from employees already employed or previously employed for said each employment position of the plurality of employment positions;

storing the employment position data in a data storage;

receiving over the Internet candidate data from the candidate computing device representative of personality traits for the employment candidate;

implementing a matching process by applying instructions from the set of instructions using the computer processor to compare said candidate data with the plurality of ranges of the employment position data to match the potential employment position from the employment position data in order to compute a tabulated score representative of the match;

generating a unique identifier for use by the employer in determining authenticity of the employment candidate; and based on the tabulated score, providing electronically over the Internet to the candidate computing device a match result including:

a list of one or more employment positions pertaining to said each employment position, the list including said match; and the unique identifier for authenticating the employment candidate utilized the matching process of the Web server in order to receive the match result;

wherein the candidate computing device utilizes the unique identifier to directly initiate contact with the employer computing device electronically over the Internet concerning the one or more employment positions from the list, such that the employer computing device is withheld information by the Web server of the match result.

2. The method of claim 1, wherein each said range of values is a range of values assembled using a job profile data collected from multiple employees.

3. The method of claim 1 further comprising, providing said employment candidate with a candidate questionnaire in order to determine said candidate data.

4. The method of claim 3, further comprising providing an employee questionnaire to one or more successful employees associated with said specific employment positions and determining said employment position data from candidate answers to the employee questionnaire.

5. The method of claim 4, wherein said candidate questionnaire and said employee questionnaire are identical.

6. The method of claim 1, wherein the plurality of ranges represents aggregate data collected from a plurality of individuals.

7. The method of claim 1, wherein said candidate data comprises a plurality of numerical values, each numerical value indicative of a personality trait for said employment candidate.

8. The method of claim 1, wherein each of said plurality of ranges for each employment position as a numerical range corresponds to one of said plurality of values for said employment candidate as a numerical value.

9. The method of claim 8, wherein said comparing comprises determining which of the numerical values for said employment candidate falls within a corresponding range for each employment position of the plurality of employment positions.

10. The method of claim 1, wherein said comparing includes calculating a metric comparing each trait of said employment candidate, with a corresponding trait for each of said employment positions.

11. The method of claim 10, wherein each metric is calculated by calculating a difference between a value for said trait of said employment candidate, and an average of a corresponding range for an employment position.

12. The method of claim 11, wherein said comparing further comprising summing all of said metrics to arrive at a score indicative of said employment candidate's suitability for an employment position.

13. The method of claim 1, wherein the unique identifier is embodied in a certificate, the certificate for authenticating that said employment candidate obtained said list from said Web server.

14. The method of claim 1, wherein the unique identifier is embodied as a network identifier of the Internet for the employer computing device.

15. The method of claim 14, wherein the network identifier is a URL, such that the URL is not generally known in order to facilitate said authenticating.

16. The method of claim 1, further comprising:
receiving employment interest data measuring a plurality of defined interests for suitable candidates for each employment position of the plurality of employment positions;
storing said employment interest data;
receiving individual candidate interest data, representative of interests for the employment candidate;
and comparing said candidate interest data with said employment interest data to determine the potential employment position.

17. The method of claim 1, wherein at least one of said defined plurality attributes are chosen from the list of independence; competitiveness; assertiveness; conscientiousness; convention; organization; extroversion; group orientation; outgoing; stability; poise; relaxation; and social desirability.

18. A computer readable tangible medium for implementation by a Web server for authenticating a match of an employment candidate with one or more of a plurality of employment positions, the Web server in communication with an employer computing device and a candidate computing device over the Internet, the employer computing device and the candidate computing device communicating with the Web server over the Internet using network browsers, the computer readable tangible medium storing computer software as a set of instructions that when loaded into the Web server, programs the Web server via execution of the set of instructions by a computer processor to:
receive over the Internet employment position data from the employer computing device measuring a plurality of defined personality traits for suitable employment candidates for each of the plurality of employment positions of a plurality of employment positions, the employment position data including a plurality of ranges, each range indicative of a range of values for a respective personality trait of a suitable candidate for said each employment position of the plurality of employment positions, the personality traits containing trait information from employees already employed or previously employed for said each employment position of the plurality of employment positions;
store the employment position data in a data storage at said computing device;
receive over the Internet candidate data from the candidate computing device representative of personality traits for the employment candidate;
implement a matching process by applying instructions from the set of instructions using the computer processor to compare said candidate data with the plurality of ranges of the employment position data to match the potential employment position from the employment position data in order to compute a tabulated score representative of the match;
generating a unique identifier for use by the employer in determining authenticity of the employment candidate; and
based on the tabulated score, provide over the Internet to the candidate computing device a match result including:
a list of one or more employment positions pertaining to said each employment position, the list including said match; and
the unique identifier for authenticating the employment candidate utilized the matching process of the Web server in order to receive the match result;
wherein the candidate computing device utilizes the unique identifier to directly initiate contact with the employer computing device electronically over the Internet concerning the one or more employment positions from the list, such that the employer computing device is withheld information by the Web server of the match result.

19. A Web server, for interconnection with the Internet, for authenticating a match of an employment candidate with one or more of a plurality of employment positions, the Web server in communication with an employer computing device and a candidate computing device over the Internet, the employer computing device and the candidate computing device communicating with the Web server over the Internet using network browsers, said Web server comprising:
a computer processor;
computer memory in communication with said computer processor, said computer memory storing processor readable instructions programming said Web Server via execution of the set of instructions to:
receive over the Internet employment position data from the employer computing device measuring a plurality of defined personality traits for suitable employment candidates for each of the plurality of employment positions of a plurality of employment positions, the employment position data including a plurality of ranges, each range indicative of a range of values for a respective personality trait of a suitable candidate for said each employment position of the plurality of employment positions, the personality traits containing trait information from employees already employed or previously employed for said each employment position of the plurality of employment positions;
store the employment position data in a data storage at said computing device;

receive over the Internet candidate data from the candidate computing device representative of personality traits for the employment candidate;

implement a matching process by applying instructions from the set of instructions using the computer processor to compare said candidate data with the plurality of ranges of the employment position data to match the potential employment position from the employment position data in order to compute a tabulated score representative of the match;

generating a unique identifier for use by the employer in determining authenticity of the employment candidate; and based on the tabulated score, provide over the Internet to the candidate computing device a match result including:

a list of one or more employment positions pertaining to said each employment position, the list including said match; and the unique identifier for authenticating the employment candidate utilized the matching process of the Web server in order to receive the match result;

wherein the candidate computing device utilizes the unique identifier to directly initiate contact with the employer computing device electronically over the Internet concerning the one or more employment positions from the list, such that the employer computing device is withheld information by the Web server of the match result.

* * * * *